(12) United States Patent
Dhanapal et al.

(10) Patent No.: US 12,409,595 B2
(45) Date of Patent: *Sep. 9, 2025

(54) SIZER FOR AN EXTRUSION MACHINE WITH IMPROVED COOLING AND VACUUM CHANNELS

(71) Applicant: Engineered Profiles LLC, Columbus, OH (US)

(72) Inventors: Vickram Dhanapal, Delaware, OH (US); Gary Oney, Londonderry, OH (US); Roger May, Lancaster, OH (US); Troy Kimmes, Johnstown, OH (US)

(73) Assignee: Engineered Profiles LLC, Columbus, OH (US)

(*) Notice: Subject to any disclaimer, the term of this patent is extended or adjusted under 35 U.S.C. 154(b) by 669 days.

This patent is subject to a terminal disclaimer.

(21) Appl. No.: 17/745,273

(22) Filed: May 16, 2022

(65) Prior Publication Data

US 2022/0266497 A1 Aug. 25, 2022

Related U.S. Application Data

(63) Continuation-in-part of application No. 16/565,982, filed on Sep. 10, 2019, now Pat. No. 11,331,841.

(Continued)

(51) Int. Cl.
*B29C 48/88* (2019.01)
*B29C 48/09* (2019.01)
(Continued)

(52) U.S. Cl.
CPC ............ *B29C 48/911* (2019.02); *B29C 48/09* (2019.02); *B29C 48/12* (2019.02); *B29C 48/147* (2019.02);
(Continued)

(58) Field of Classification Search
CPC ....... B29C 48/09; B29C 48/12; B29C 48/254; B29C 48/256; B29C 48/503;
(Continued)

(56) References Cited

U.S. PATENT DOCUMENTS 3,804,567 A 4/1974 Recknagel
4,401,424 A 8/1983 De Zen
(Continued)

FOREIGN PATENT DOCUMENTS

| CN | 202241940 U | 5/2012 |
| CN | 109605700 A | 4/2019 |
| DE | 19854932 A1 | 10/1999 |

OTHER PUBLICATIONS themoldingblog.com, site visited Jun. 4, 2018, http://www.themoldingblog.com/2017/02/17/sabic-seeks-patent-for-conformal-cooling-via-additive-manufacturing/.
(Continued)

*Primary Examiner* — Xiao S Zhao
*Assistant Examiner* — Joseph S Leyson
(74) *Attorney, Agent, or Firm* — Standley Law Group LLP; Jeffrey S. Standley; Jeffrey C. Norris

(57) ABSTRACT

A sizer for cooling an extrudate, which includes a core and a housing. The core includes an extrusion channel which accommodates the extrudate, a core cooling channel, and a core vacuum channel in fluid communication with the extrusion channel. The housing includes a housing cooling channel and a housing vacuum channel. The core cooling channel is in fluid communication with the housing cooling channel, and the core vacuum channel is in fluid communication with the housing vacuum channel.

45 Claims, 14 Drawing Sheets

Related U.S. Application Data

(60) Provisional application No. 62/729,789, filed on Sep. 11, 2018.

(51) Int. Cl.

| | | |
|---|---|---|
| *B29C 48/12* | (2019.01) | |
| *B29C 48/14* | (2019.01) | |
| *B29C 48/25* | (2019.01) | |
| *B29C 48/30* | (2019.01) | |
| *B29C 48/87* | (2019.01) | |
| *B29C 48/90* | (2019.01) | |

(52) U.S. Cl.
  CPC .......... *B29C 48/254* (2019.02); *B29C 48/256* (2019.02); *B29C 48/25686* (2019.02); *B29C 48/3003* (2019.02); *B29C 48/87* (2019.02); *B29C 48/903* (2019.02); *B29C 48/904* (2019.02); *B29C 48/916* (2019.02)

(58) Field of Classification Search
  CPC ... B29C 48/903; B29C 48/904; B29C 48/908; B29C 48/913; B29C 48/916
  See application file for complete search history.

(56) References Cited

U.S. PATENT DOCUMENTS

| | | | |
|---|---|---|---|
| 4,545,751 A * | 10/1985 | Lupke | B29C 49/58 425/72.1 |
| 5,288,218 A | 2/1994 | Melkonian | |
| 6,200,119 B1 | 3/2001 | Pelto et al. | |
| 6,387,303 B1 * | 5/2002 | Jones | B29D 99/0053 264/263 |
| 6,394,782 B1 | 5/2002 | Grassi | |
| 8,517,248 B2 | 8/2013 | Zaffino | |
| 9,056,419 B2 | 6/2015 | Bell et al. | |
| 11,331,841 B2 * | 5/2022 | Dhanapal | B29C 48/904 |
| 2001/0018078 A1 | 8/2001 | Kossl | |
| 2001/0043963 A1 | 11/2001 | Zhang et al. | |
| 2003/0012834 A1 | 1/2003 | Kossi | |
| 2007/0026179 A1 | 2/2007 | de Boer et al. | |
| 2008/0185065 A1 | 8/2008 | Dreckotter et al. | |
| 2010/0084037 A1 | 4/2010 | Ericsson et al. | |
| 2012/0175006 A1 | 7/2012 | Frimel et al. | |
| 2014/0037880 A1 | 2/2014 | Siddhamalli et al. | |
| 2014/0116563 A1 | 5/2014 | Fernando et al. | |
| 2014/0291886 A1 | 10/2014 | Mark et al. | |
| 2017/0043518 A1 | 2/2017 | Narayanaswamy | |
| 2017/0226355 A1 | 8/2017 | Torfs et al. | |
| 2017/0328651 A1 | 11/2017 | Rozga et al. | |
| 2020/0079002 A1 | 3/2020 | Dhanapal et al. | |
| 2022/0266497 A1 | 8/2022 | Dhanapal et al. | |

OTHER PUBLICATIONS

Jolker, R. et al., Controlling Heat Balance in a Hot Aluminum Extrusion by Additive Manufactured Extrusion Dies with Conformal Cooling Channels, International Journal of Precision Engineering and Manufacturing, Aug. 8, 2013, pp. 1487-1493, vol. 14, No. 8.

Marques, S. et al., Design of Conformal Cooling for Plastic Injection Moulding by Heat Transfer Simulation, Polimeros, 2015, pp. 564-574.

Paul Whittaker: "Metal Additive Manufacturing", Powdermetallurgy Review, ipmd.net, Sep. 30, 2014 (Sep. 30, 2014). pp. 1-92.

* cited by examiner

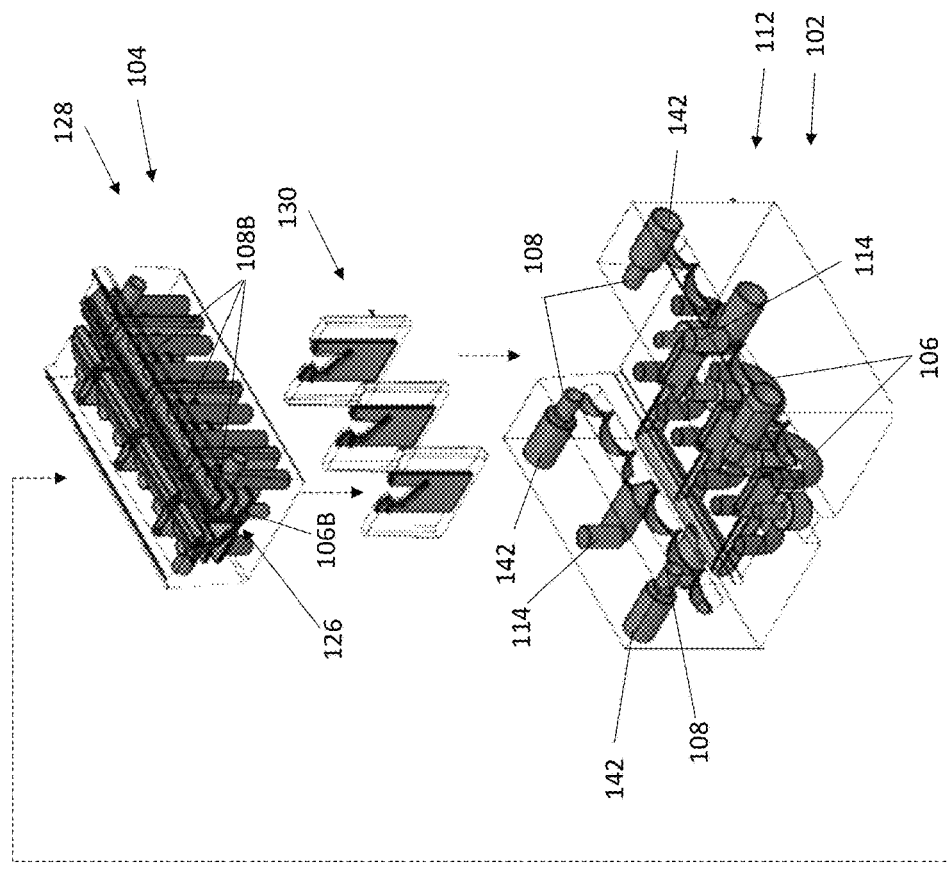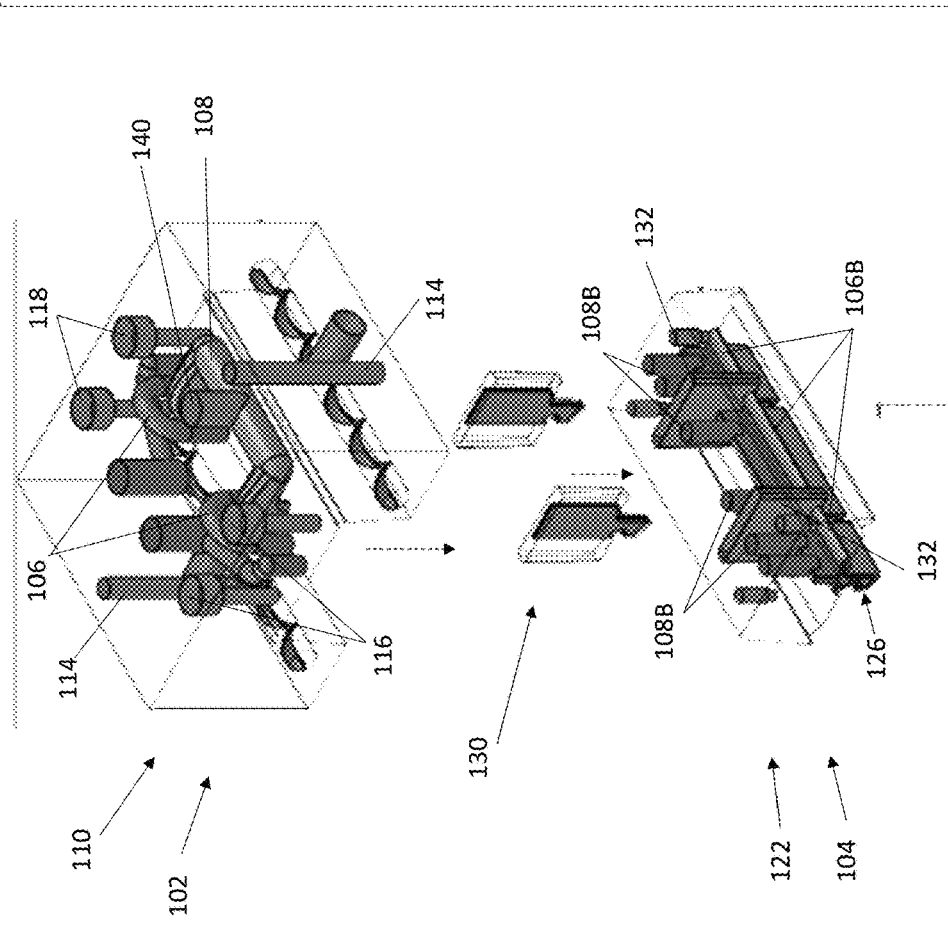
FIGURE 1

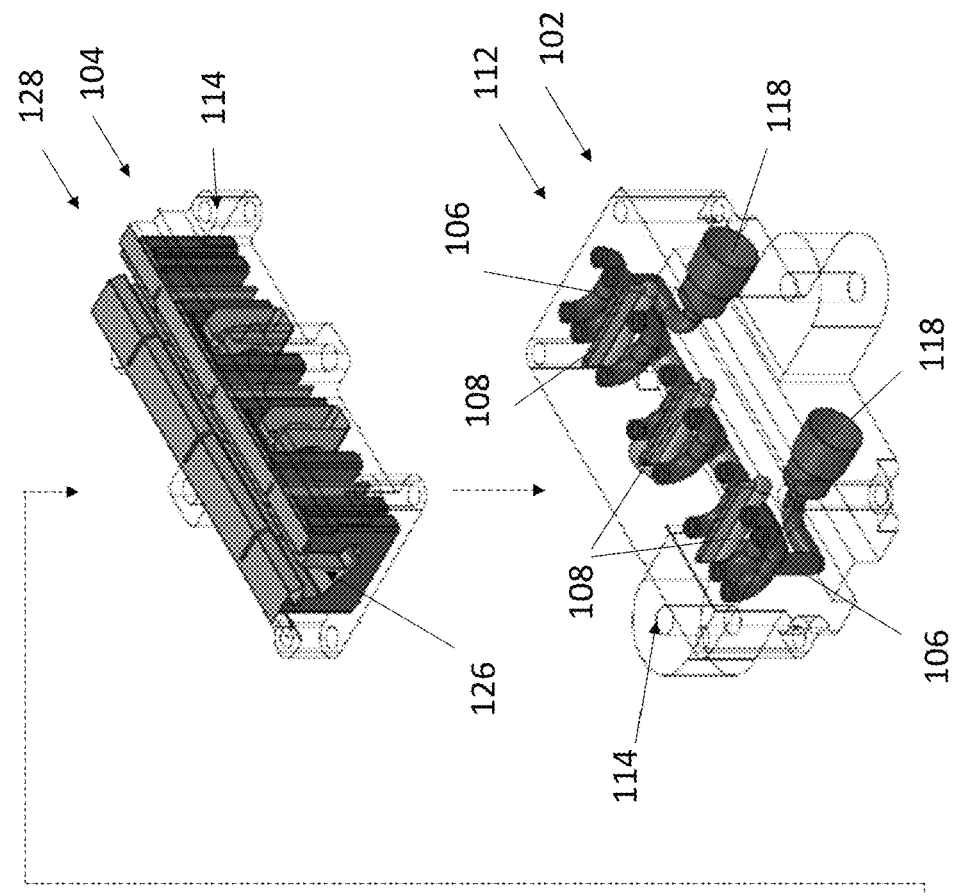
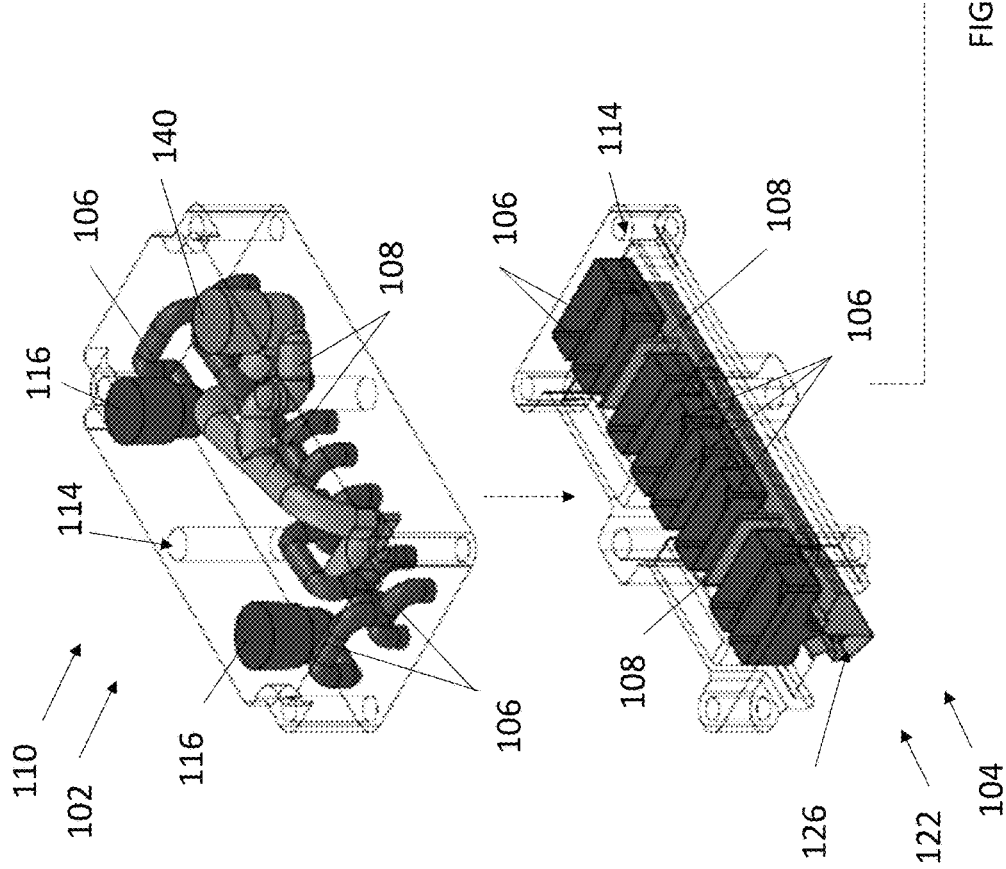
FIGURE 3

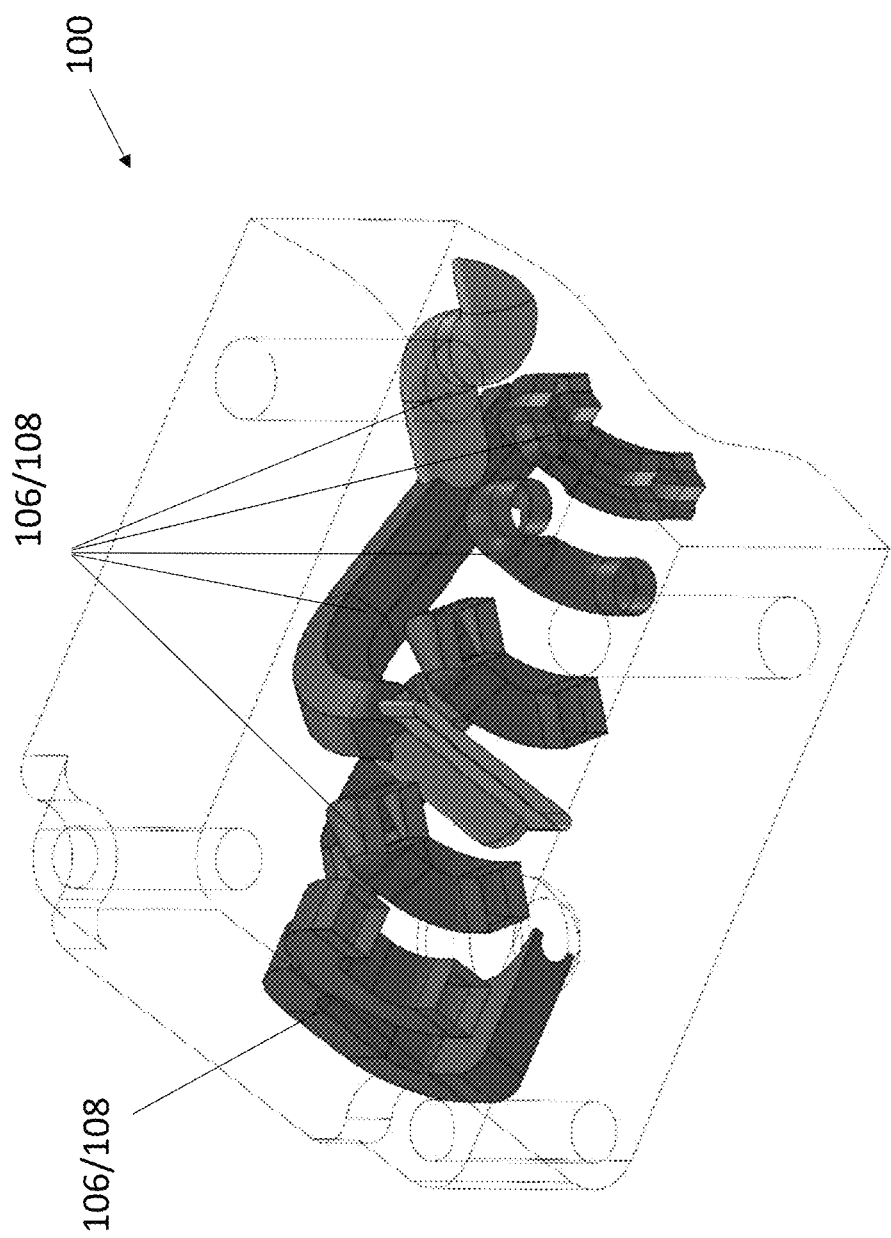

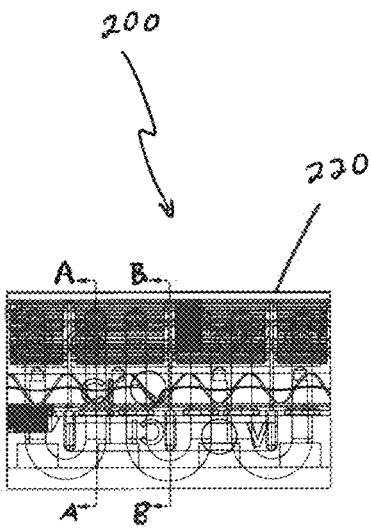
Figure 7B
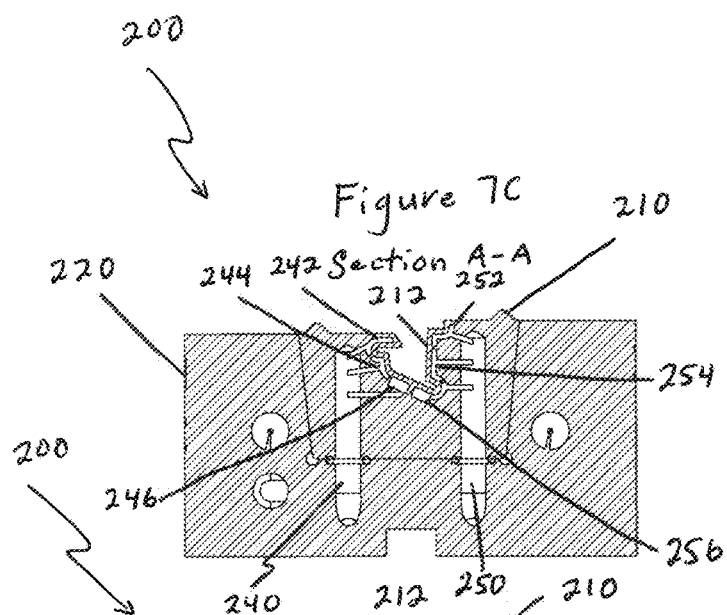
Figure 7C
Figure 7D
Section B-B
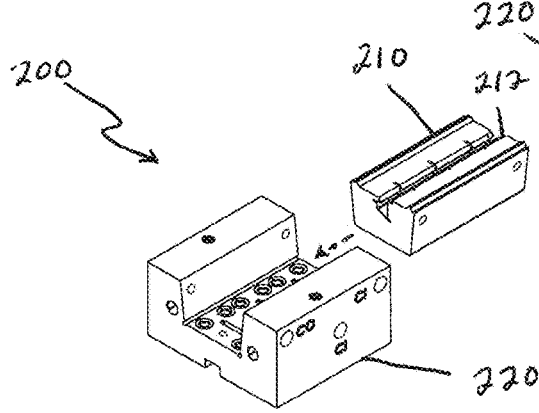
Figure 7A
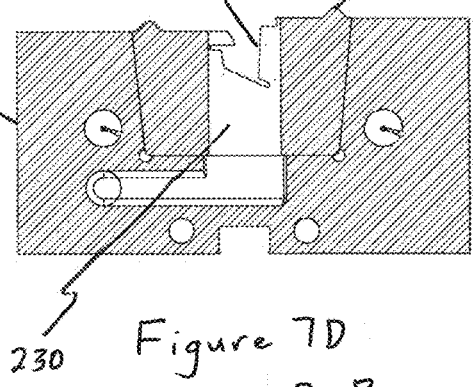

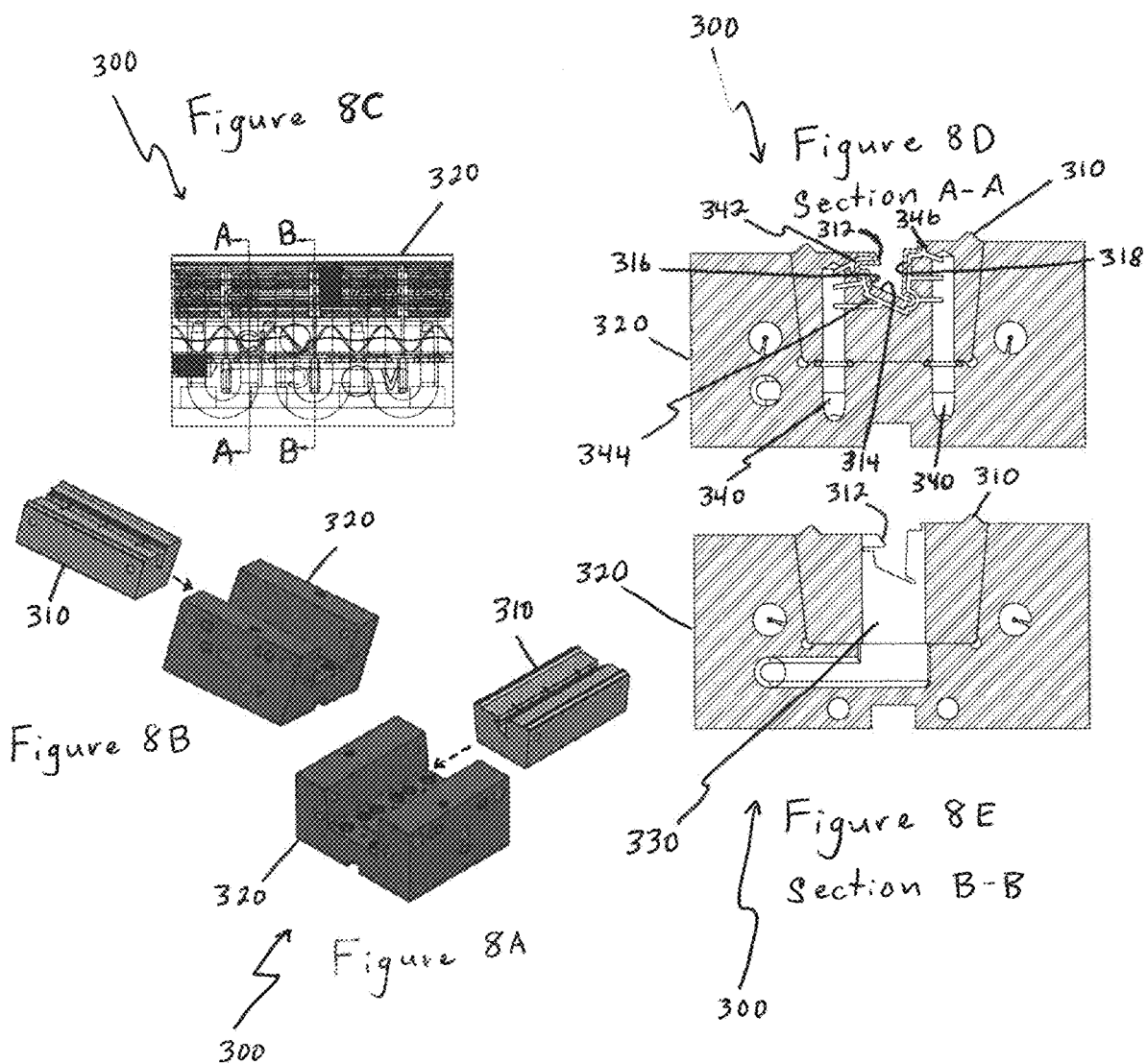

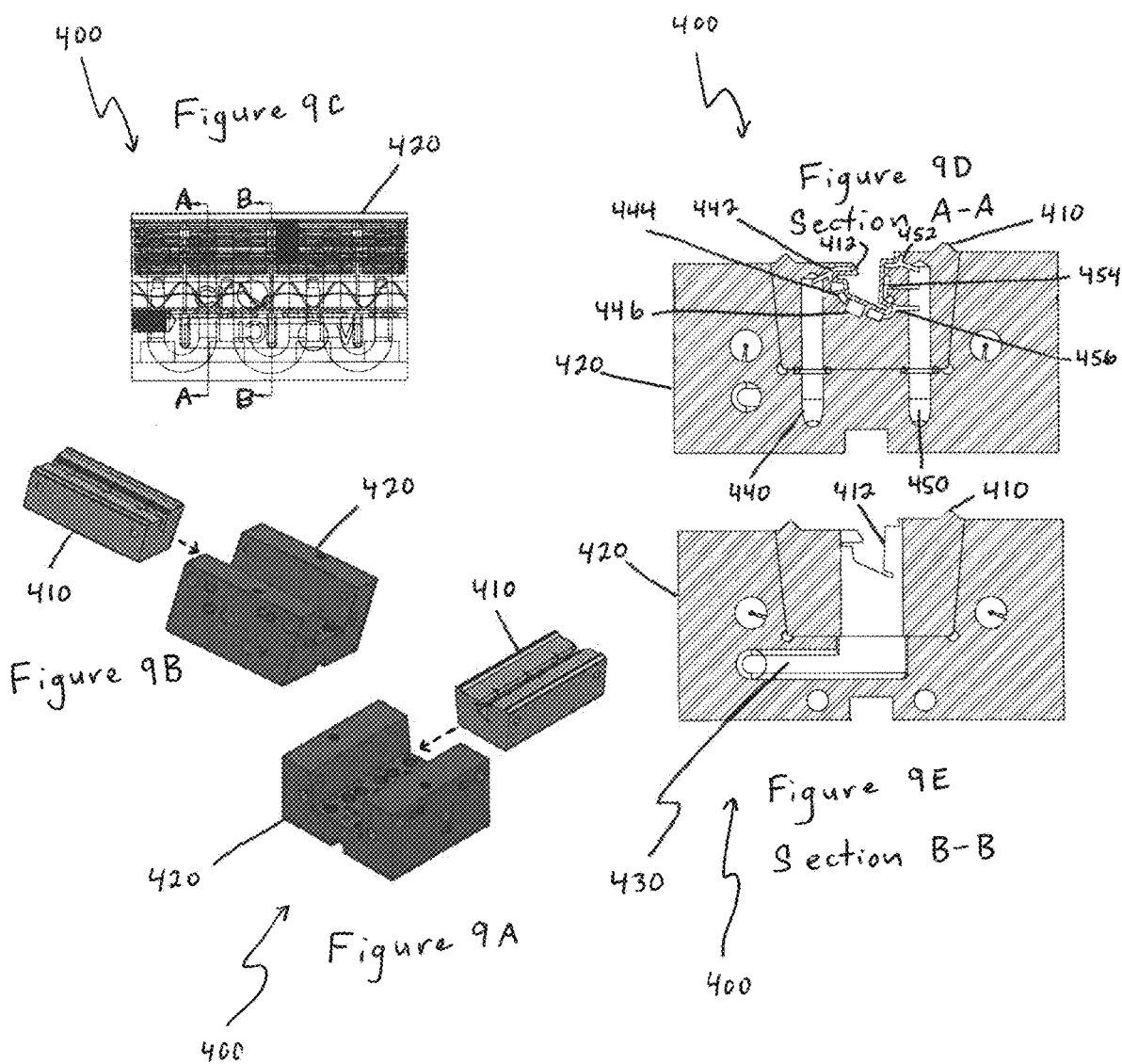

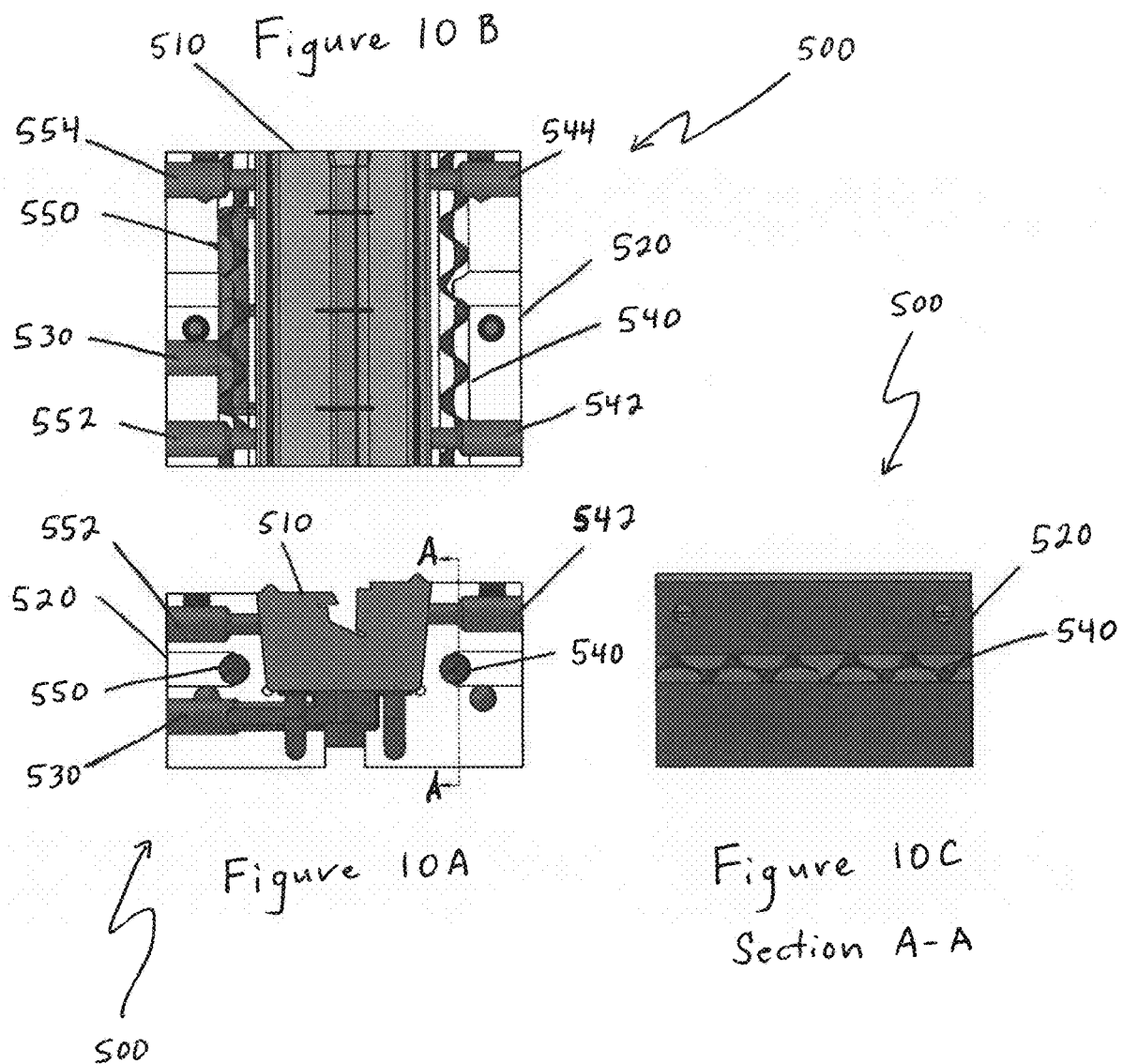

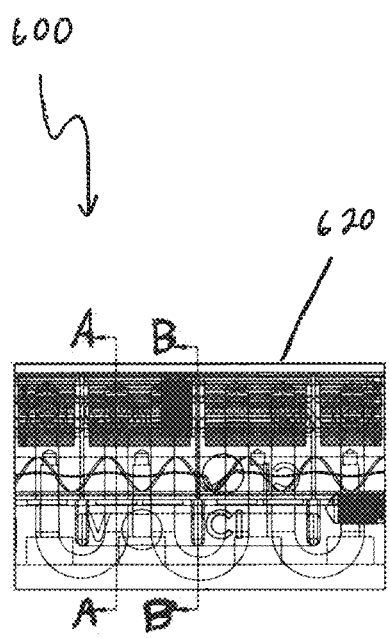
Figure 11A
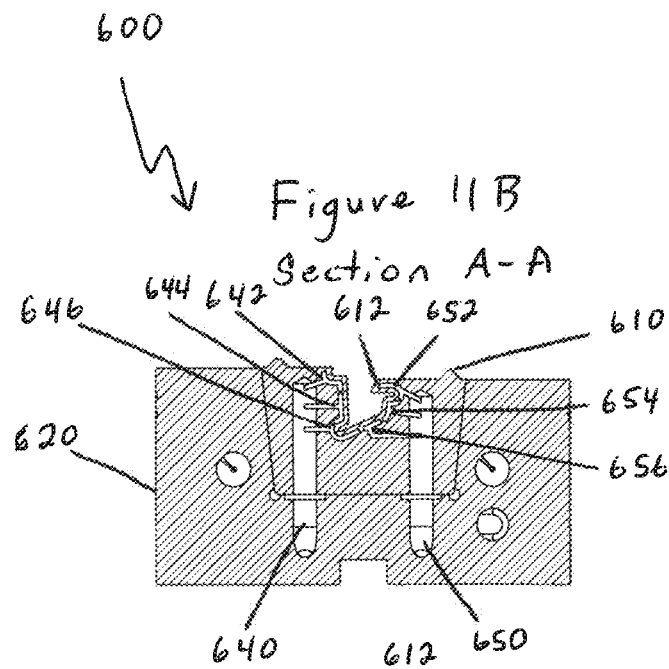
Figure 11B Section A-A
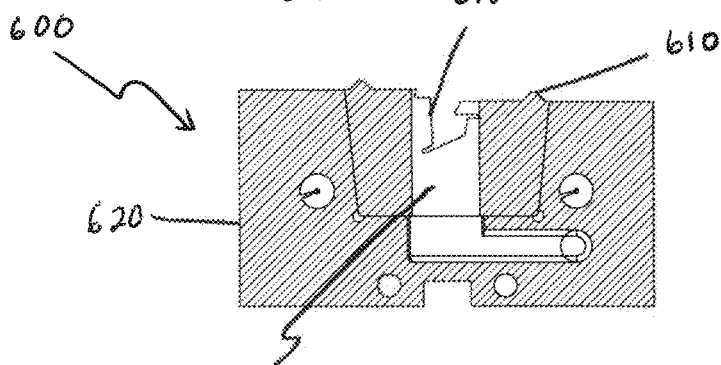
Figure 11C Section B-B

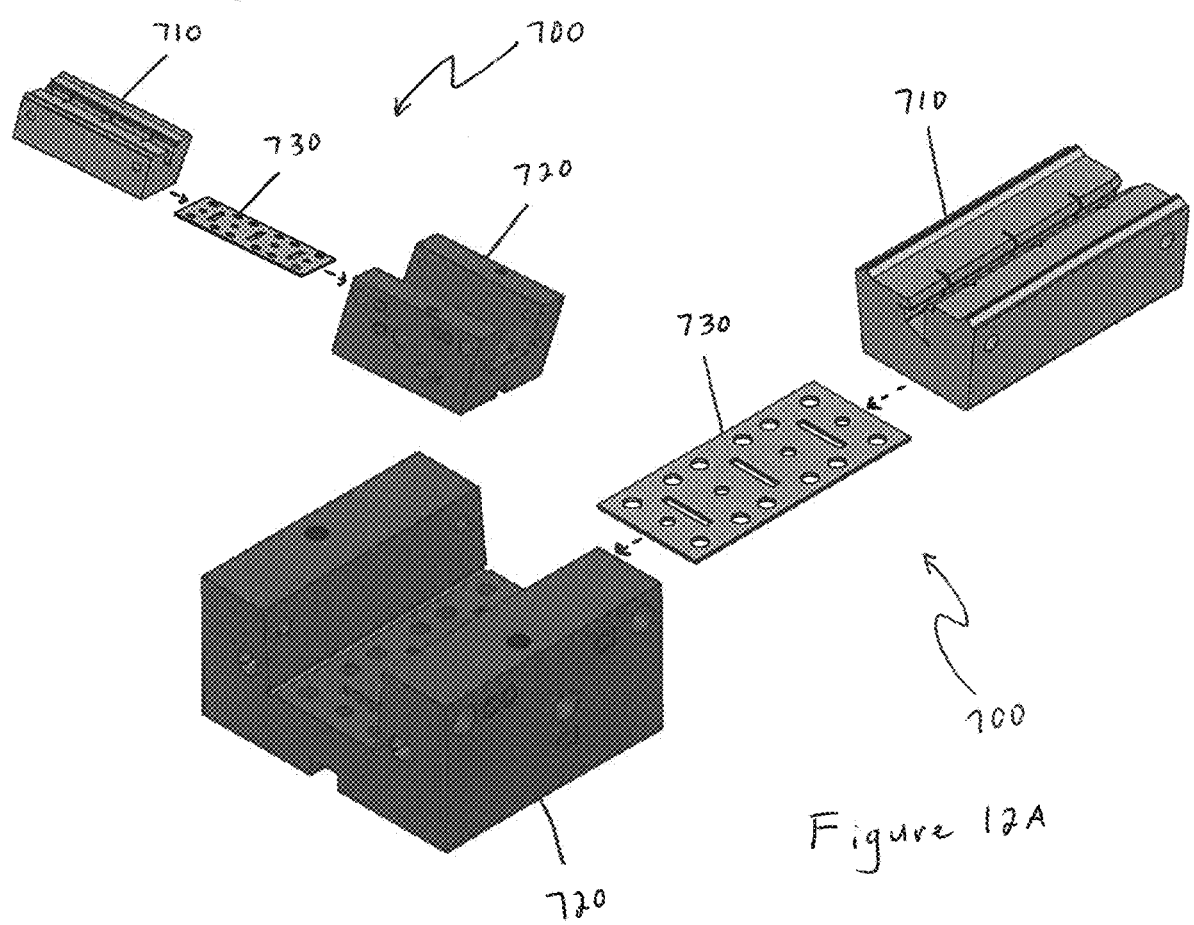

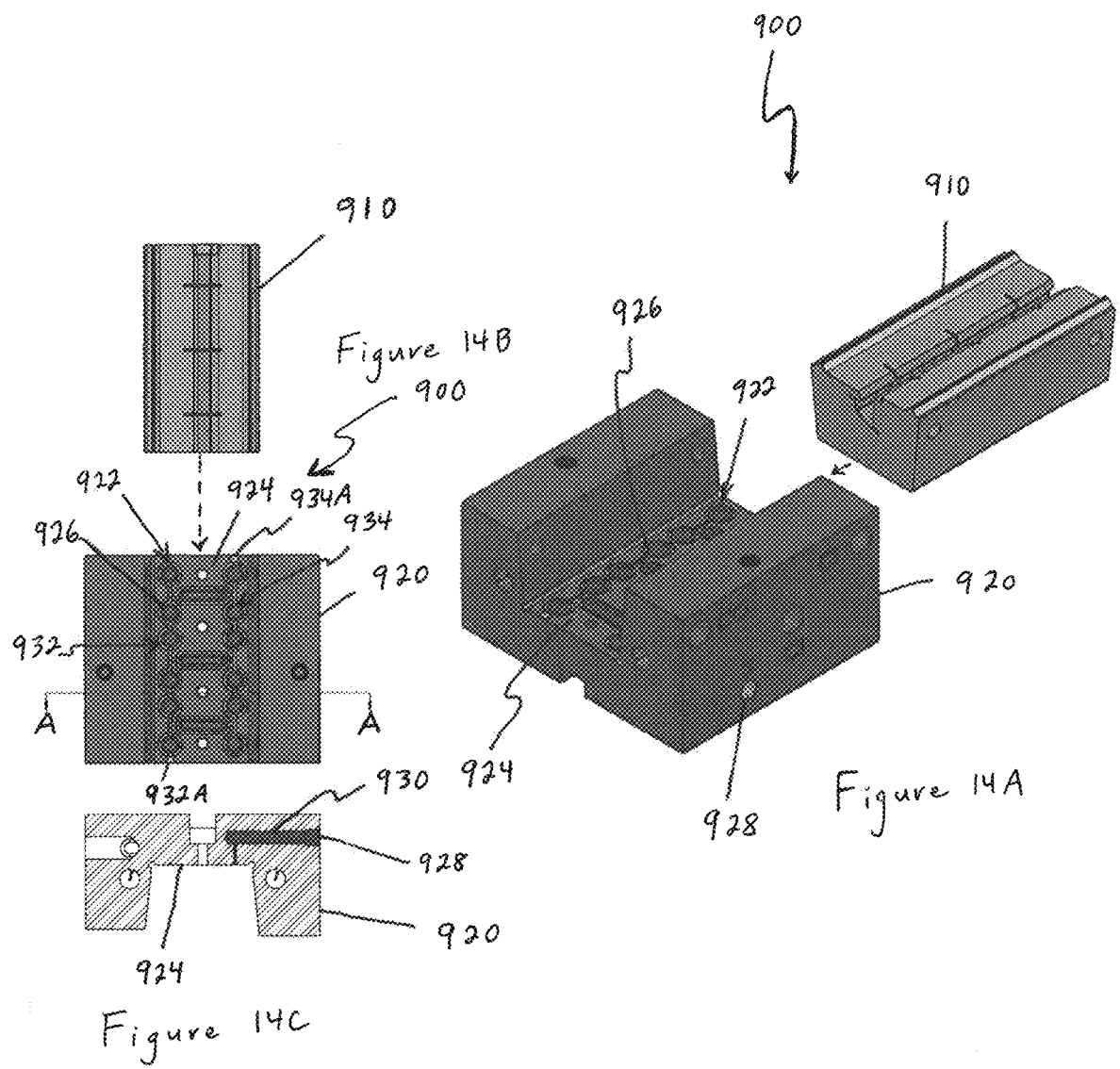

SIZER FOR AN EXTRUSION MACHINE WITH IMPROVED COOLING AND VACUUM CHANNELS

CROSS-REFERENCE TO RELATED APPLICATIONS

This application is a continuation-in-part of U.S. application Ser. No. 16/565,982, filed Sep. 10, 2019, which claims the benefit of U.S. Provisional Application No. 62/729,789, filed Sep. 11, 2018, the disclosures of which are hereby incorporated by reference as if fully restated herein.

TECHNICAL FIELD

Exemplary embodiments relate generally to sizers for creating extrusion profiles.

BACKGROUND AND SUMMARY OF THE INVENTION

Making a profile through extrusion requires two key components: a die to shape the molten material into the desired shape, and sizers to maintain the shape as the material cools to create a stable end product. Depending on the shape of the desired extrudate and the level of temperature reduction required, multiple sizers may be provided in succession to achieve adequate cooling. Typically, these sizers are made of two separately formed pieces that are joined together and define a hollow extrusion channel for the extrudate to flow through, although a single piece may be used as well.

Within the sizer components, vacuum channels may be provided above and below the extrudate to maintain the extrudate's shape as it passes through the extrusion channel. Without the vacuum channels, gravity might cause undesired deformations. However, these vacuum channels create obstacles for cooling channels, which may be required to adequately cool the extrudate. As water flows through the cooling channels, heat may be conductively removed from the extrudate. Ideally, the cooling channels conform to the shape of the extrudate and run along at least a portion of the length of the extrudate channel to maximize cooling efficiency. As both the vacuum and cooling channels require interaction with the extrusion channel, positioning both types of channels in a way which provides sufficient proximity and interaction with the extrudate to achieve both adequate cooling and adequate distribution of material is spatially challenging.

The single or multi-piece sizer may begin as a solid piece of metal with the appropriate shaped channels (extrusion, cooling, and vacuum) being removed from the solid piece(s) by subtractive manufacturing. In the case of a multi-piece construction, material may be removed from the top and/or bottom pieces which when joined may form the various channels.

Conventional, subtractive manufacturing techniques for creating cooling and vacuum channels require drilling into the sizer to create the channels. This approach provides certain drawbacks. For example, channels manufactured by such techniques cannot contain non-linear pathways (e.g., curves) to avoid other channels. Where the channels must change direction, they are limited to sharply angled intersections, typically at 90-degrees. These intersections do not provide for efficient flow of cooling fluids or transmission of vacuum forces. Furthermore, each segment of the channel to be drilled out requires a separate entry and exit point. Where more than one segment is required, the additional entry and exit points must subsequently be plugged. In order to adequately form cooling and vacuum pathways around the extrusion channel, oftentimes the cooling and vacuum channels are temporarily intersected to create such channels, and must later be filled to create separation between the cooling and vacuum pathways. Further still, such drilling generally results in round channels, which are not always desirable.

There exists a need in the art for sizers with improved cooling and vacuum channels. The present disclosures provide sizers with improved cooling and vacuum channels.

To improve the cooling and vacuum channels, non-linear pathways may be created. These non-linear pathways may permit cooling and vacuum channels to be provided without intersecting one another. These non-linear pathways may also maximize the efficiency of cooling flow and the transmission of vacuum forces. For example, without limitation, non-linear cooling channels may be configured to induce turbulence in the cooling fluid and/or may permit the cooling channels or vacuum channels to more closely conform to at least a portion of the extrusion channel. As a further example, without limitation, smooth shaped curves and a lack of sharply angled intersections may provide for more even distribution of vacuum forces.

In exemplary embodiments, the sizer may be formed from a housing and a core. The core may comprise an upper portion and a lower portion, which may be formed separately, though such is not required. The core may comprise any number of pieces. The core may be formed using subtractive manufacturing techniques, such as conventional drilling. In such embodiments, the cooling and vacuum channels may be linear, though such is not required. The core may be comprised of a thermally conductive material, such as metal. The core may comprise an extrusion channel as well as one or more cooling and vacuum channels.

The housing may comprise an upper portion and a lower portion, which may be formed separately, though such is not required. The housing may comprise any number of pieces. The housing may be comprised of a polymer or other material. The housing may be created by additive manufacturing techniques, such as, but not limited to, 3-D printing. The housing may comprise cooling and vacuum channels. The cooling and vacuum channels may comprise one or more non-linear segments, such as, but not limited to, smooth curves, though such is not required. The cooling and vacuum channels of the housing may be configured to provide fluid communication with the cooling and vacuum channels of the core when the housing is joined to the core. The housing may further comprise one or more cooling inlets and exits for the ingestion and expulsion of cooling fluid. The housing may further comprise one or more vacuum inlets and exits for the ingestion and expulsion of suction forces. In exemplary embodiments, the cooling and vacuum channels may be configured to extend through multiple sizers. In such cases, inlets and exits for cooling fluids and suction may not be required on particular sizers.

In exemplary embodiments, the core may be created through additive manufacturing techniques, such as, but not limited to, 3-D printing. In such embodiments, the cooling and vacuum channels may comprise one or more non-linear segments, such as, but not limited to, smooth curves, though such is not required. Regardless, the cooling and vacuum channels of the housing may be provided to align with the cooling and vacuum channels of the core.

In addition, or alternatively, the cooling and vacuum channels may be formed into various geometric cross sections. Such cross sections may be designed to induce or reduce turbulence of cooling fluid flows or to impact particular suction forces, for example, without limitation.

In some exemplary embodiments, the entire housing and core may be created as a single piece by additive manufacturing. The cooling and vacuum channels of the housing may be provided in one or more standard sizes. This may enable only a new core to be created with the associated housing and vacuum channels instead of creating an entirely new sizer for each individual profile extrusion.

The sizer may allow for less material to be used for the core of the sizer, providing faster and cheaper manufacturing turnover. Additionally, the sizer may permit the creation of improved cooling and vacuum channels in more sizer-space than previously capable. The cooling and vacuum channels may be restricted only by the volume of the sizer. Vortexes or other shapes creating still or turbulent flows may be provided as needed to cool the profile.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 illustrates an exploded view of an exemplary embodiment of a sizer;

FIG. 3 is an exploded view of another exemplary sizer;

FIG. 6 is a perspective view of a top portion of an exemplary sizer with certain components illustrated in a hidden state to illustrate certain interior components of the sizer;

FIG. 7A is an exploded view of an exemplary embodiment of a sizer;

FIG. 7B is an opposite side view of the sizer of FIG. 7A in an assembled state, wherein certain interior or otherwise not visible features in this view are illustrated in a hidden state;

FIG. 7C is a cross-sectional view of the sizer of FIG. 7B along section line A-A;

FIG. 7D is a cross-sectional view of the sizer of FIG. 7B along section line B-B;

FIG. 8A is an exploded view of an exemplary embodiment of a sizer;

FIG. 8B is an exploded view from an opposite side of the sizer of FIG. 8A;

FIG. 8C is a side view of the sizer of FIG. 8B in an assembled state, wherein certain interior or otherwise not visible features in this view are illustrated in a hidden state;

FIG. 8D is a cross-sectional view of the sizer of FIG. 8C along section line A-A;

FIG. 8E is a cross-sectional view of the sizer of FIG. 8C along section line B-B;

FIG. 9A is an exploded view of an exemplary embodiment of a sizer;

FIG. 9B is an exploded view from an opposite side of the sizer of FIG. 9A;

FIG. 9C is a side view of the sizer of FIG. 9B in an assembled state, wherein certain interior or otherwise not visible features in this view are illustrated in a hidden state;

FIG. 9D is a cross-sectional view of the sizer of FIG. 9C along section line A-A;

FIG. 9E is a cross-sectional view of the sizer of FIG. 9C along section line B-B;

FIG. 10A is a side view of an exemplary embodiment of a sizer, wherein certain interior or otherwise not visible features in this view are illustrated in a hidden state;

FIG. 10B is a top plan view of the sizer of FIG. 10A, wherein certain interior or otherwise not visible features in this view are illustrated in a hidden state;

FIG. 10C is a cross-sectional view of the sizer of FIG. 10A;

FIG. 11A is a side view of an exemplary embodiment of a sizer, wherein certain interior or otherwise not visible features in this view are illustrated in a hidden state;

FIG. 11B is a cross-sectional view of the sizer of FIG. 11A along section line A-A;

FIG. 11C is a cross-sectional view of the sizer of FIG. 11A along section line B-B;

FIG. 12A is an exploded view of an exemplary embodiment of a sizer;

FIG. 12B is an exploded view from an opposite side of the sizer of FIG. 12A;

FIG. 14A is an exploded view of an exemplary embodiment of a sizer;

FIG. 14B is an exploded view from a top side of the sizer of FIG. 14A; and

FIG. 14C is a cross-section view of the sizer of FIG. 14B along section line A-A.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 2:
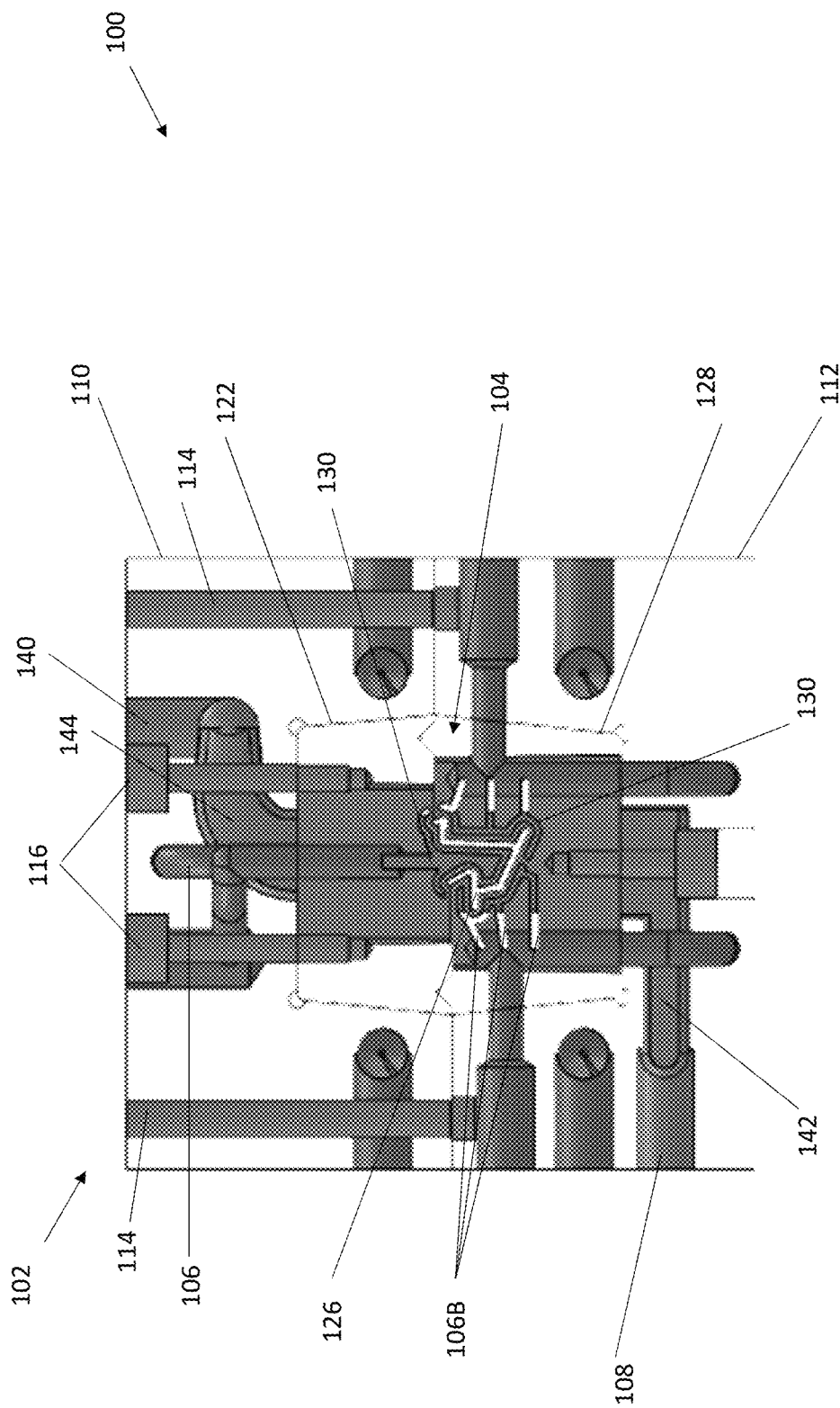
FIG. 2 illustrates a cross-sectional view of the sizer of FIG. 1 in an assembled state.
Figure 4:
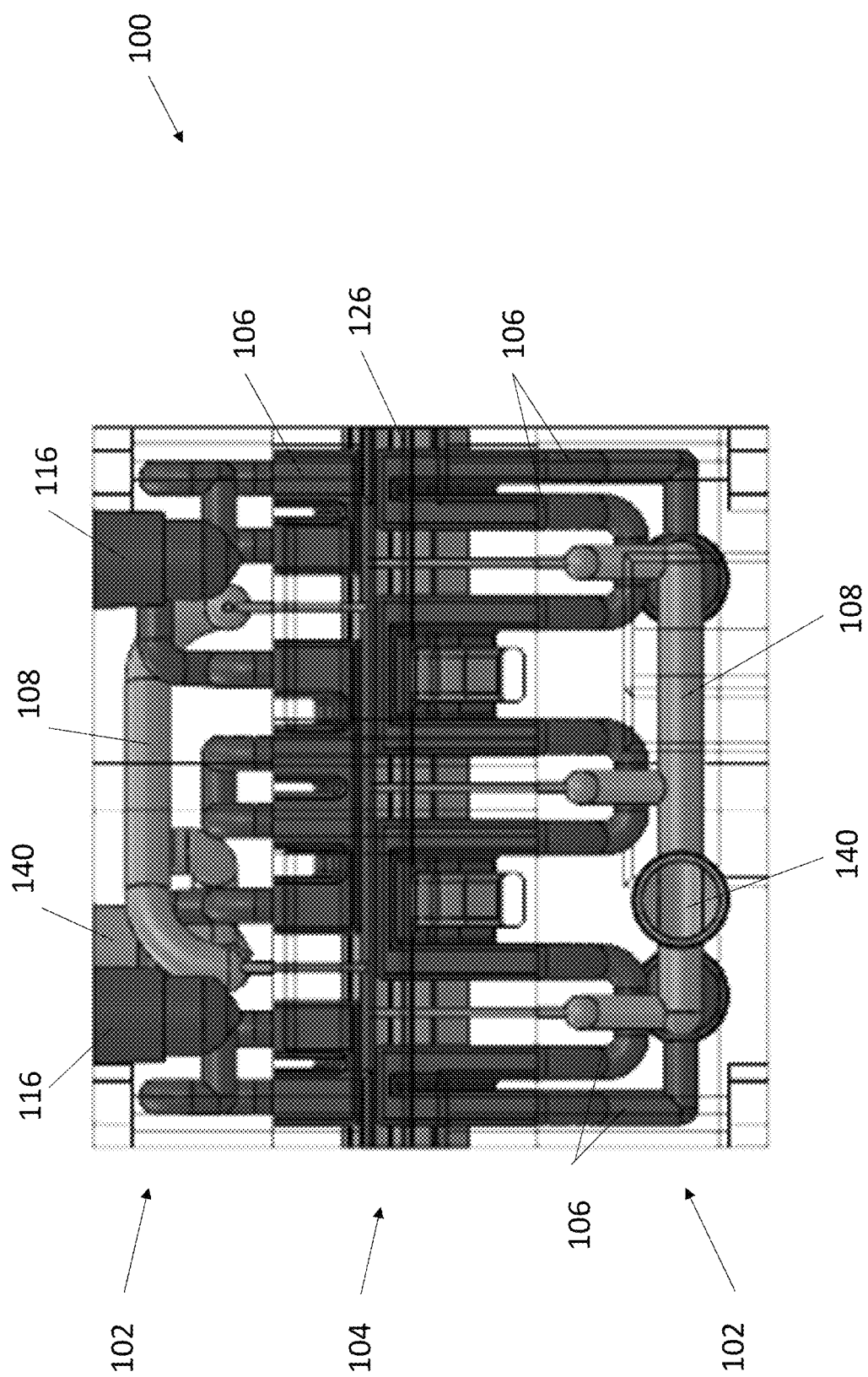
FIG. 4 is a side view of the sizer of FIG. 3 in an assembled state.

FIG. 1 and FIG. 2 illustrate an exemplary sizer 100. The sizer 100 may comprise a housing 102 and a core 104. The core 104 may comprise an extrusion channel 126. The extrusion channel 126 may be configured to accommodate the extrudate. The housing 102 may comprise an upper portion 110 and a lower portion 112. The housing 102 may comprise any number of pieces. For example, without limitation, the housing 102 may be formed by joining multiple pieces, at least some of which fit into the side of the sizer 100 as inserts. The upper portion 110 and the lower portion 112 may be separately formed, though such is not required. In exemplary embodiments, the housing 102 may be created through additive manufacturing techniques, such as, but not limited to, 3-D printing. The housing 102 may be comprised of a polymer, metal, composite, or other material.

The housing 102 may comprise one or more cooling channels 106. In exemplary embodiments, one or more of the cooling channels 106 may comprise one or more non-linear segments. Such non-linear segments may include, for example, without limitation, curves, corkscrews, rounded bends, U-shaped turns, sinuous passageways, S-curves, some combination thereof, or the like. The cooling channels 106 may be configured to extend in proximity to the extrusion channel 126. In exemplary embodiments, the cooling channels 106 may extend along some or all of the extrusion channel 126. The cooling channels 106 may be configured to increase or reduce turbulence as required to provide adequate cooling. For example, without limitation, curves, corkscrews, rounded bends, U-shaped turns, sinuous passageways, S-curves, some combination thereof, or the like may be provided to induce turbulence. Alternatively, or additionally, smooth turns and relatively straight passageways may be provided to reduce turbulence and increase flow rate.

The housing 102 may comprise one or more vacuum channels 108. In exemplary embodiments, the vacuum channels 108 may comprise one or more non-linear segments. Such non-linear segments may comprise, for example, without limitation, curves, corkscrews, rounded bends, U-shaped turns, sinuous passageways, S-curves, some combination thereof, or the like. The cooling channels 106 and/or the vacuum channels 108 may be configured to avoid one another. The cooling channels 106 and/or the vacuum channels 108 may not intersect one another. In exemplary embodiments, such cooling channels 106 and vacuum channels 108 are provided in both the upper portion 110 and lower portion 112 of the housing, though such is not required.

One or more alignment devices 114 may be provided in the housing 102. In exemplary embodiments, one or more alignment channels are provided in the upper portion 110 of the housing 102 and one or more corresponding alignment protrusions are provided in the lower portion 112 of the housing 102, though the reverse is contemplated. The alignment protrusions may be configured to be mated with the alignment channels. In other embodiments, the alignment devices 114 may comprise channels and a rod, clamp, fastener or other device may be inserted through the alignment channels.

One or more cooling inlets 116 may be provided in the housing 102. One or more cooling outlets 118 may be provided in the housing 102. It is contemplated that such cooling inlets 116 and/or outlets 118 may be provided in the upper portion 110 and/or the lower portion 112. One or more vacuum inlets 140 may be provided in the housing 102. It is contemplated that such vacuum inlets 140 may be provided in the upper portion 110 and/or the lower portion 112 of the housing 102. In other exemplary embodiments, the cooling channels 106 and/or the vacuum channels 108 may be configured to interact with the cooling channels 106 and/or the vacuum channels 108 of an adjacent sizer 102; in such cases, the cooling inlets 116 and outlets 118 and/or the vacuum inlets 140 may not be required. The cooling inlets 116 and outlets 118 and/or the vacuum inlets 140 may be provided in an outer surface of the housing 102. The cooling inlets 116 and outlets 118 may be placed in fluid communication with the cooling channels 106. The vacuum inlets 140 may be placed in fluid communication with the vacuum channels 108.

The cooling channels 106 may be configured to accommodate a coolant, such as, but not limited to, water. The cooling channels 106 may be configured to provide conductive thermal heat transfer between the relatively warm extrudate in the extrusion channel 126 and the coolant in the cooling channels 106. The cooling inlet(s) 116 may be placed in fluid communication with a reservoir, pump, tubing, piping, some combination thereof, or the like which transports coolant to the cooling inlet(s) 116 for passage through the cooling channels 106 and to the cooling outlet(s) 118 to exit the sizer 100. The cooling outlet(s) 118 may be placed in fluid communication with a container, drain, pump, tubing, piping, some combination thereof, or the like for removing the coolant from the sizer 100.

The vacuum channels 108 may be in fluid communication with the extrusion channel 126. The vacuum channels 108 may be configured to facilitate the transmission of suction forces to the extrudate located in the extrusion channel 126. The vacuum channels 108 may be configured to provide suction forces which provide desirable distribution of extrudate material within the extrusion channel 126. The vacuum inlet(s) 140 may be placed in fluid communication with a pump, tubing, piping, some combination thereof, or the like which transports suction forces to the extrusion channel 126.

The housing 102 may be configured to accommodate a core 104. The core 104 may be comprised of a metal such as, but not limited to, steel, aluminum, stainless steel, another thermally conductive material, or some combination thereof. In other exemplary embodiments, the core 104 may be comprised of a non-metallic, thermally conductive material such as a polymer, composite, or the like. In some exemplary embodiments, such as those shown in FIG. 1 and FIG. 2, the core 104 may be created using subtractive manufacturing techniques such as, but not limited to, drilling, wire EDM, some combination thereof, or the like. In such cases, at least portions of the cooling channels 106 in the core 104 may comprise one or more linear cooling segments 106B. Preferably, the linear cooling segments 106B extend along some or all of the extrusion channel 126. The vacuum channels 108 in the core 104 may comprise one or more linear cooling channels 108B. The linear vacuum channels 108B may extend through some or all of the core 104. In some exemplary embodiments, all of the cooling channels 106 in the core 104 may comprise linear cooling segments 106B and all of the vacuum channels 108 in the core 104 may comprise linear vacuum segments 108B.

One or more gaps 132 may be formed into the core 104 to accommodate subtractive manufacturing of the cooling channels 106 and/or the vacuum channels 108. One or more inserts 130 may be provided for placement in the gaps 132 to block passage of coolant or suction therebeyond. Such gaps 132 may be provided to facilitate subtractive manufacturing of the cooling channels 106 and/or the vacuum channels 108, such as by driller. Such gaps 132 may be portions of the cooling channels 106 and/or the vacuum channels 108 which are subsequently blocked or plugged.

The core 104 may comprise an upper portion 122 and a lower portion 128. The core 104 may comprise any number of pieces. For example, without limitation, the core 104 may be formed by joining multiple pieces, at least some of which fit into the side of the sizer 100 as inserts. The upper portion 122 and lower portion 128 of the core 104 may be configured to fit together. When joined, the upper portion 122 and the lower portion 128 may form the extrusion channel 126, the linear cooling channels 106B, and the linear vacuum channels 108B.

The upper portion 110 and the lower portion 112 of the housing 102 may be configured to fit together. When joined, the upper portion 110 and the lower portion 112 may form the cooling channels 106 and the vacuum channels 108.

Referring to FIG. 3 through FIG. 5C, other exemplary embodiments of the sizer 100 are depicted. In such embodiments, the core 104, alternatively, or in addition to the housing 102, may comprise non-linear cooling channels 106. The core 104, alternatively, or in addition to the housing 102, may comprise non-linear vacuum channels 108. The core 104 may be made by additive manufacturing, such as, but not limited to, 3-D printing. Such embodiments may eliminate the need for gaps 132 and inserts 130, though such is not required.

Figure 5C:
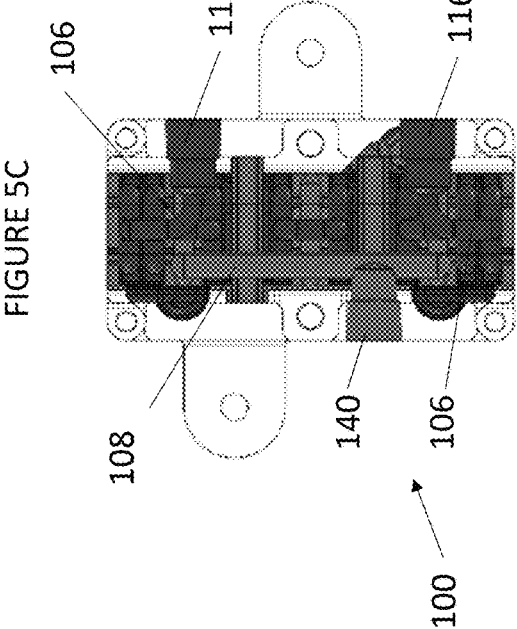
FIG. 5C is a bottom view of the assembled sizer of FIG. 4.
Figure 5B:
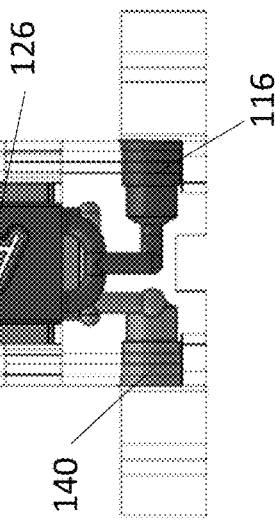
FIG. 5B is a front view of the assembled sizer of FIG. 4.
Figure 5A:
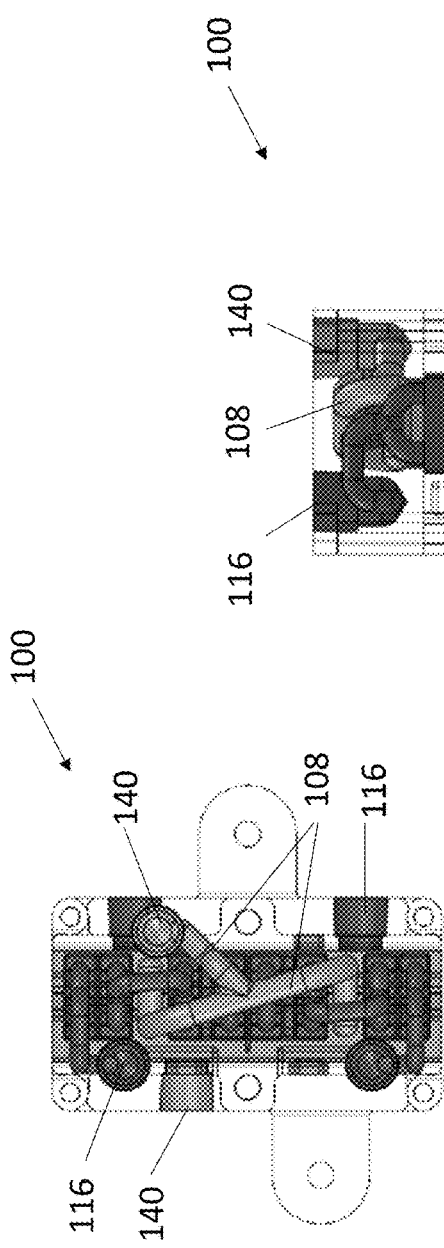
FIG. 5A is a top view of the assembled sizer of FIG. 4.

As shown, particularly with regard to FIG. 2 and FIG. 5B, the cooling channels 106 in the core 104 may closely conform to at least a portion of the shape of the extrusion channel 126. The vacuum channels 108 may closely confirm to the shape of the extrusion channel 126. For example, without limitation, the cooling channels 106 and the vacuum channels 108 may be located between $1/1,000^{th}$ inch to 2 inches of the extrusion channel 126.

As shown, particularly in FIG. 6, the cooling channels 106 and/or the vacuum channels 108 may be provided with various geometric cross sections, such as, but not limited to, circles, squares, stars, ovals, rectangles, some combination thereof, or the like. While FIG. 6 is illustrated with respect to the upper portion 110 of the housing 102, it is contemplated that such various geometric cross sections may be utilized with any portion of the housing 102 and/or the core 104.

The design, shape, and placement of cooling channels 106 and vacuum channels 108 as well as the cooling inlets 116, cooling outlets 118, and vacuum inlets 140 are each exemplary and are not intended to be limiting. Any design, shape, and placement of such cooling channels 106, vacuum channels 108, cooling inlets 116, cooling outlets 118, and vacuum inlets 140 are contemplated.

In exemplary embodiments, the alignment device 114 may comprise a number of threaded and/or non-threaded holes and fasteners. The holes may be provided on the upper portion 110 and/or lower portion 112 of the housing 102 as well as the upper portion 122 and/or lower portion 128 of the core 104. The holes may be configured to accommodate one or more fasteners for securing such parts to one another. After forming the housing 102 and/or the core 104 by additive manufacturing, wire EDM or another subtractive manufacturing technique may be utilized to provide a finished surface. While discussed with respect to cooling channels 106 and vacuum channels 108, it is contemplated that channels for other purposes may be so utilized. One or more handles may be provided on the upper portion 110 and/or lower portion 112 of the housing 102 as well as the upper portion 122 and/or lower portion 128 of the core 104. Various portions of the upper portion 110 and/or lower portion 112 of the housing 102 as well as the upper portion 122 and/or lower portion 128 of the core 104 may be removed to reduce weight.

The profile of the illustrated extrusion channel 126 is merely exemplary and is not intended to be limiting. Any size, shape, or configuration of the extrusion channel 126 to create any size, shape, or configuration extrudate is contemplated.

As addressed above, the core and/or the housing may be comprised of any number of pieces that are joined together. As another example, at least one of an upper core portion and a lower core portion may be respectively formed of multiple pieces that are joined together. For instance, an upper core portion may be comprised of multiple pieces that are joined together while the lower core portion is comprised of a single piece, or vice versa. Likewise, an exemplary embodiment may comprise at least one of an upper housing portion and a lower housing portion that is respectively formed of multiple pieces that are joined together. Again, as with the examples of a core, an upper housing portion may be comprised of multiple pieces that are joined together while the lower housing portion is comprised of a single piece, or vice versa.

Other variations of a housing and a core are possible. For example, FIGS. 7A-13B show various embodiments of sizers respectively comprising at least one housing portion and at least one core portion. In these examples, only a lower housing portion and lower core portion are shown for ease of reference, wherein the lower housing portion and the lower core portion are configured to be associated with an upper housing portion and an upper core portion such as previously discussed. Other exemplary embodiments may comprise one housing portion and one core portion. For yet another example, such as noted above, the entire housing and core may be created as a single piece. For instance, a core and a housing may be created by being printed together by additive manufacturing (e.g., 3-D printing). However, unless otherwise specified, any suitable manufacturing techniques may be used to create any number of pieces of a housing and a core. Furthermore, the examples shown in FIGS. 7A-13B may benefit from any of the features of the other embodiments of this application. Likewise, those other exemplary embodiments may benefit from any of the features described with respect to FIGS. 7A-13B.

Exemplary embodiments may also control the cooling of an extrudate by the position or other characteristics of the at least one cooling channel. FIGS. 7A-7D show one example of a sizer 200 having cooling channels that are adapted to facilitate control of the cooling of an extrudate and/or to adapt to space limitations within a housing. Sizer 200 is comprised of a core 210 that is positioned in a housing 220. Core 210 comprises an extrusion channel 212 that is adapted to accommodate an extrudate. Housing 220 has at least one input (labeled CI) and at least one output (labeled CO) for the coolant, and at least one inlet (labeled V, which is not visible in FIG. 7A) adapted to receive the suction force of a vacuum (i.e., adapted to be in fluid communication with a vacuum source). The at least one inlet for a vacuum is associated with a vacuum channel 230 that extends through the core 210 and housing 220. On the other hand, for cooling, this exemplary embodiment has a cooling channel 240 and a cooling channel 250, which each respectively extend through core 210 and housing 220.

In this example, cooling channel 240 has portion 242, portion 244, and portion 246 adjacent to the extrusion channel 212, whereas cooling channel 250 has portion 252, portion 254, and portion 256 adjacent to the extrusion channel 212. In order to facilitate control of the cooling of an extrudate, portion 246 is larger (i.e., more volume as determined when there is a cross-section across the width of the extrusion channel 212) than portions 242 and 244 to facilitate the receipt of more coolant in that area for better cooling of an extrudate in that area (compared to portions 242 and 244, which are adapted to receive less coolant, respectively, for less cooling impact in those areas). Likewise, portion 256 is larger than portions 252 and 254 to facilitate the receipt of more coolant in that area for better cooling of an extrudate in that area. Such an example may be useful for cooling an extrudate that has different thicknesses or materials in certain areas (e.g., next to portions 246 and 256 in this example) that require different cooling. As another example, space may be limited for some portions of a cooling channel, which may require a relatively small cooling portion in that area (e.g., around cooling portion 242 in this example). Other exemplary embodiments may have a different number, size characteristics, and/or placement of the portions of a cooling channel adjacent to an extrusion channel to facilitate desired control of the cooling of an extrudate.

Exemplary embodiments may also control the cooling of an extrudate by the thickness of a core between a cooling channel and an extrusion channel. FIGS. 8A-8E show one example of a sizer 300 having different thicknesses of a core between a cooling channel and an extrusion channel to facilitate control of the cooling of an extrudate. Sizer 300 is comprised of a core 310 that is positioned in a housing 320. Core 310 comprises an extrusion channel 312 that is adapted to accommodate an extrudate. Housing 320 has at least one input (labeled CI) and at least one output (labeled CO) for the coolant, and at least one inlet (labeled V) adapted to receive the suction force of a vacuum (i.e., adapted to be in fluid communication with a vacuum source). The at least one inlet for a vacuum is associated with a vacuum channel 330 that extends through the core 310 and housing 320. On the other hand, for cooling, this exemplary embodiment has a cooling channel 340, which extends through core 310 and housing 320 and about extrusion channel 312.

In this example, cooling channel 340 has portion 342, portion 344, and portion 346 adjacent to the extrusion channel 312. In order to facilitate control of the cooling of an extrudate, a portion 314 of the core is thicker between the extrusion channel 312 and cooling channel 340 to lessen the cooling effect in that area (compared to portions 316 and 318, which are thinner, respectively, for less cooling impact). In this example, portion 314 is thicker relative to only a portion of portion 344 of cooling channel 340. In other exemplary embodiments, a thicker portion may be situated elsewhere with respect to at least one portion of a cooling channel. Such an example may be useful for cooling an extrudate more slowly where the core is thickest between an extrusion channel and a cooling channel. This exemplary embodiment may be beneficial for an extrudate that has different thicknesses or materials in certain areas that require different cooling. Other exemplary embodiments may have a different number, size characteristics (e.g., wavy thickness changes, multiple thickness changes, etc.), and/or placement of at least one portion of a core that is thicker (compared to other portions) between at least one cooling channel and an extrusion channel to facilitate desired control of the cooling of an extrudate.

It may also be desirable to control the flow rate of a coolant through the portions of a cooling channel. For instance, the cooling of an extrudate may be unbalanced if the flow rate of a coolant is uneven through the portions of a cooling channel. In view of this need, exemplary embodiments may also facilitate control of the cooling of an extrudate by promoting more balanced cooling velocity in the portions of a cooling channel. FIGS. 9A-9E show one example of a sizer 400 adapted to facilitate control of the coolant velocity. Sizer 400 is comprised of a core 410 that is positioned in a housing 420. Core 410 comprises an extrusion channel 412 that is adapted to accommodate an extrudate. Housing 420 has at least one input (labeled CI) and at least one output (labeled CO) for the coolant, and at least one inlet (labeled V) adapted to receive the suction force of a vacuum (i.e., adapted to be in fluid communication with a vacuum source). The at least one inlet for a vacuum is associated with a vacuum channel 430 that extends through the core 410 and housing 420. On the other hand, for cooling, this exemplary embodiment has a cooling channel 440 and a cooling channel 450, each of which extends through core 410 and housing 420.

In this example, cooling channel 440 has portion 442, portion 444, and portion 446 adjacent to the extrusion channel 412, whereas cooling channel 450 has portion 452, portion 454, and portion 456 adjacent to the extrusion channel 412. In order to achieve more uniform cooling of an extrudate in this exemplary embodiment, portions 442, 444, and 446 have respective sizes adapted to facilitate control of cooling by promoting more balanced cooling velocity in each of the portions as compared to an otherwise similar core cooling channel in which none of the portions differ in size. In particular, in this example, portion 446 is larger than portion 444, which is larger than 442, in order to facilitate more balanced cooling velocity in each of the portions. On the other hand, portion 456 is larger than portions 452 and 454 in this embodiment to facilitate more balanced cooling velocity in those portions. Such an example may be useful such as when the shapes of a core and/or a housing require or result in a cooling channel that would otherwise promote unbalanced cooling velocities in the respective portions of the cooling channel. In other words, the respective shapes of the portions of a cooling channel adjacent to an extrusion channel may influence the cooling velocity in each channel. More balanced cooling velocity may be particularly useful such as when an extrudate has a similar thickness throughout to facilitate more uniform cooling. Other exemplary embodiments may have a different number, size characteristics, and/or placement of the portions of a cooling channel adjacent to an extrusion channel to facilitate more balanced cooling velocity control.

It may also be desirable to be able to facilitate control of the cooling of an extrudate in other manners. FIGS. 10A-10C show an example of a sizer that is adapted to facilitate heat transfer. In this exemplary embodiment, sizer 500 is comprised of a core 510 that is positioned in a housing 520. At least one vacuum channel 530 extends through the core 510 and housing 520. On the other hand, there is at least one vortex cooling channel adapted to induce a turbulent coolant flow to improve heat transfer. In this example, there is a vortex cooling channel 540 and a vortex cooling channel 550. Vortex cooling channel 540 is in fluid communication with a coolant supply 542 and a coolant outlet 544, each of which may extend through the core 510 and housing 520. Similarly, vortex cooling channel 550 is in fluid communication with a coolant supply 552 and a coolant outlet 554, each of which may extend through the core 510 and housing 520. In this example, vortex cooling channel 540 is positioned in housing 520 along one side of the core 510, and vortex cooling channel 550 is positioned in housing 520 along an opposite side of core 510. In other exemplary embodiments, a vortex cooling channel (and any associated supplies and outlets) may have any other suitable placement to facilitate desired cooling control.

Any of the exemplary embodiments may include at least one cooling channel that is continuous or non-continuous adjacent to at least a portion of the width of an extrusion channel (as determined when there is a theoretical cross-section along the width of the extrusion channel). Certain embodiments may benefit from being continuous or non-continuous adjacent to the width of an extrusion channel. FIGS. 11A-11C show one example of a sizer 600 having cooling channels that are adapted to facilitate control of the cooling of an extrudate and/or to adapt to space limitations within a housing. Sizer 600 is comprised of a core 610 that is positioned in a housing 620. Core 610 comprises an extrusion channel 612 that is adapted to accommodate an extrudate. Housing 620 may have at least one input and at least one output for the coolant, and at least one inlet adapted to receive the suction force of a vacuum (i.e., adapted to be in fluid communication with a vacuum source). The at least one inlet for a vacuum is associated with a vacuum channel 630 that extends through the core 610 and housing 620. On the other hand, for cooling, this exemplary embodiment has a cooling channel 640 and a cooling channel 650, which each respectively extend through core 610 and housing 620.

In this example, cooling channel 640 has portion 642, portion 644, and portion 646 adjacent to the extrusion channel 612, whereas cooling channel 650 has portion 652, portion 654, and portion 656 adjacent to the extrusion channel 612. In this exemplary embodiment, portions 642, 644, and 646 respectively form individual cooling portions that are positioned adjacent to the extrusion channel. Likewise, portions 652, 654, and 656 respectively form individual cooling portions that are positioned adjacent to the extrusion channel. Regarding individual cooling portions, this determination is made when there is a theoretical cross-section along a width of the extrusion channel, such as shown in FIG. 11B. "Individual cooling portions" is not intended to preclude the portions from being joined at their proximal ends, again such as shown in the example of FIG. 11B. In this exemplary combination, portions 642, 644, 646, 652, 654, and 656 are positioned substantially about an entirety of the width of the extrusion channel. Other exemplary embodiments may have a cooling channel that is continuous adjacent to at least a major portion of a width of extrusion channel, such as shown in the example of FIG. 8D. In this instance, a major portion is defined to be at least half of the width of the extrusion channel, and is determined when there is a theoretical cross-section along the width of the extrusion channel. Other exemplary embodiments may have a different number, size characteristics, and/or placement of the at least one portion of at least one cooling channel adjacent to an extrusion channel to facilitate desired control of the cooling of an extrudate.

In any of the aforementioned embodiments, a housing cooling channel and a core cooling channel may be adapted to circulate any suitable coolant for an application. Examples of suitable coolants may comprise liquids and gases, or other suitable materials, which may be natural or synthetic.

Exemplary embodiments may also include a seal that is adapted to limit leakage of the coolant between a core and a housing. FIGS. 12A and 12B show one example of the use of a conformal seal. In this exemplary embodiment, sizer 700 comprises a core 710 that is positioned in a housing 720. Core 710 and housing 720 may be similar to, or different than, other cores and housings discussed herein. However, in this exemplary embodiment, sizer 700 further comprises a conformal seal 730 positioned between core 710 and housing 720, which is adapted to limit leakage of the coolant between the core 710 and housing 720.

Figures 13A, 13B:
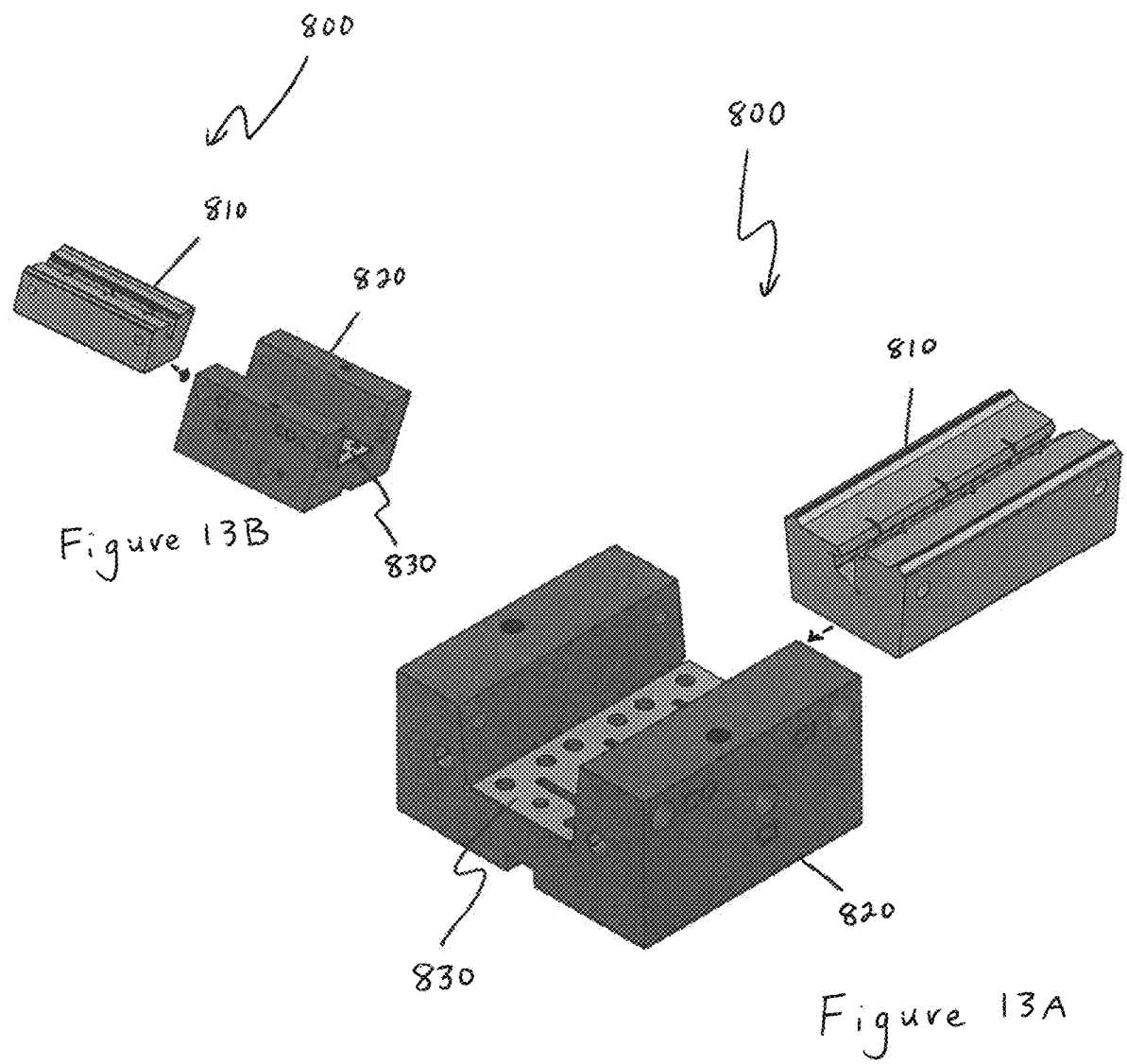
FIG. 13A is an exploded view of an exemplary embodiment of a sizer.
FIG. 13B is an exploded view from an opposite side of the sizer of FIG. 13A.

Other exemplary embodiments may have a seal that is not conformal. For instance, examples of a seal may be selected from a group consisting of O-rings, printed seals, continuous cut seals, and overmolded seals, or other suitable types of seals, which may or may not be conformal. An example of a seal may be comprised of a rigid or flexible material, such as, but not limited to, plastics. As a further example, a seal may be integrated in a housing, such as, but not limited to, an overmolded seal. FIGS. 13A-13B show an example of an overmolded seal. In this exemplary embodiment, sizer 800 comprises a core 810 and a housing 820, which may be similar to, or different than, other cores and housings discussed herein. In this example, conformal seal 830 is overmolded with housing 820 in an additive manufacturing process (e.g., 3-D printing). In other exemplary embodiments, a seal may be overmolded with a core.

Other variations of a seal and an associated method of manufacture are possible. FIGS. 14A-14C show one example of the use of a seal that may be injected into a housing and/or a core. In this exemplary embodiment, sizer 900 comprises a core 910 that is positioned in a housing 920. Core 910 and housing 920 may be similar to, or different than, other cores and housings discussed herein. In this exemplary embodiment, the housing 920 comprises at least one groove 922 on a surface 924 that is adjacent to the core 910. A seal 926 is positioned in the at least one groove 922 such that the seal 926 is positioned between core 910 and housing 920. As a result, seal 926 is adapted to limit leakage of a coolant between the core 910 and housing 920.

A seal 926 may be manufactured prior to, simultaneously with (e.g., 3-D printing), or otherwise separately from (e.g., after) at least one groove 922. In this exemplary embodiment, seal 926 is formed by injection into at least one groove 922. In particular, housing 920 comprises at least one seal injection port 928 that is adapted to facilitate injection of a sealant material into the at least one groove 922 to form the seal 926. In this embodiment, the sealant material may be comprised of a rigid or flexible material that is injectable, such as, but not limited to, plastics. In this example, seal injection port 928 is in fluid communication with a sealant channel 930 that is configured to inject the sealant material into at least one groove 922. More particularly, at least one groove 922 is comprised of a seal runner 932 and a seal runner 934, which are interconnected in this example. However, in other exemplary embodiments, seal runners may not be interconnected. In order to ensure that the sealant material flows throughout the at least one groove 922, seal runner 932 may comprise at least one sealant vent 932A, and seal runner 934 may comprise at least one sealant vent 934A.

In another exemplary embodiment, a core may comprise at least one groove on a surface that is adjacent to a housing. A seal may be positioned in the at least one groove such that the seal is positioned between the core and the housing. This example may otherwise be similar to the example in FIGS. 14A-14C to limit leakage of a coolant between a core and a housing.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A sizer for cooling an extrudate, comprising:
a core comprising:
an extrusion channel configured to accommodate the extrudate;
a core cooling channel; and
a core vacuum channel in fluid communication with the extrusion channel;
wherein the core is comprised of a metal; and
a housing for housing the core, comprising:
a housing cooling channel in fluid communication with the core cooling channel; and
a housing vacuum channel in fluid communication with the core vacuum channel;
wherein the housing is comprised of a polymer;
wherein the housing cooling channel and the core cooling channel form a cooling pathway adapted to circulate a coolant through the sizer; and
wherein the housing vacuum channel and the core vacuum channel form a vacuum pathway adapted to transmit suction forces to the extrudate.

2. The sizer of claim 1 wherein:
the housing cooling channel has a first end portion adapted to facilitate reception of the coolant and a second end portion adapted to facilitate exhaustion of the coolant; and
the housing vacuum channel has a first end portion adapted to facilitate intake of the suction forces.

3. The sizer of claim 2 further comprising:
a cooling intake located at the first end portion of the housing cooling channel and adapted to receive the coolant;
a cooling exhaust located at the second end portion of the housing cooling channel and adapted to exhaust the coolant; and
a vacuum intake located at the first end portion of the housing vacuum channel and adapted to intake the suction forces.

4. The sizer of claim 1 wherein:
the core cooling channel is configured to closely conform to the extrusion channel along at least a portion thereof.

5. The sizer of claim 4 wherein:
the core cooling channel extends between 1/100th and 2 inches from the extrusion channel.

6. The sizer of claim 1 wherein:
the cooling pathway comprises a vortex cooling portion that is adapted to induce a turbulent flow of the coolant through the cooling pathway in order to facilitate control of cooling of the extrudate.

7. The sizer of claim 1 wherein:
the core cooling channel has portions adjacent to the extrusion channel that differ in size and are adapted to facilitate control of cooling of the extrudate or to adapt to space limitations.

8. The sizer of claim 1 wherein:
the core cooling channel has portions of respective sizes adjacent to the extrusion channel and adapted to facilitate control of cooling by promoting more balanced cooling velocity in each of the portions as compared to an otherwise similar core cooling channel in which none of the portions differ in size.

9. The sizer of claim 1 wherein:
the core cooling channel is continuous adjacent to at least a major portion of a width of the extrusion channel, wherein the major portion is determined when there is a theoretical cross-section along the width of the extrusion channel.

10. The sizer of claim 1 wherein:
the core cooling channel alone, or in coordination with at least one additional core cooling channel, forms individual cooling portions that are positioned adjacent to the extrusion channel, wherein the individual cooling portions are determined when there is a theoretical cross-section along a width of the extrusion channel.

11. The sizer of claim 10 wherein:
the individual cooling portions are positioned adjacent to substantially an entirety of the width of the extrusion channel.

12. The sizer of claim 1 wherein:
the core has portions between the core cooling channel and the extrusion channel that differ in thickness and are adapted to facilitate control of cooling of the extrudate.

13. The sizer of claim 1 wherein:
the core comprises an upper core portion and a lower core portion; and
the upper core portion and the lower core portion are separately formed.

14. The sizer of claim 13 wherein:
at least one of the upper core portion and the lower core portion is respectively formed of multiple pieces that are joined together.

15. The sizer of claim 1 wherein:
the housing comprises an upper housing portion and a lower housing portion; and
the upper housing portion and the lower housing portion are separately formed.

16. The sizer of claim 15 wherein:
at least one of the upper housing portion and the lower housing portion is respectively formed of multiple pieces that are joined together.

17. The sizer of claim 1 wherein:
the housing cooling channel comprises at least one curved segment; or
the housing vacuum channel comprises at least one curved segment.

18. The sizer of claim 1 wherein:
the core cooling channel comprises at least one curved segment; or
the core vacuum channel comprises at least one curved segment.

19. The sizer of claim 1 wherein:
the housing cooling channel or the core cooling channel comprises a non-circular cross section.

20. The sizer of claim 1 wherein:
the metal is a thermally conductive material; and
the polymer is a thermally conductive material or a non-thermally conductive material.

21. The sizer of claim 1 wherein:
the metal is stainless steel.

22. The sizer of claim 1 wherein:
the core has been created by additive manufacturing; or
the housing has been created by additive manufacturing.

23. The sizer of claim 22 wherein:
the core and the housing have been created by being printed together.

24. The sizer of claim 1 further comprising:
an alignment device located in each of the core and the housing.

25. The sizer of claim 24 wherein:
the alignment device comprises a number of threaded holes configured to accommodate fasteners.

26. The sizer of claim 1 further comprising:
a seal positioned between the housing and the core;
wherein the seal is adapted to limit leakage of the coolant between the housing and the core.

27. The sizer of claim 26 wherein:
the seal is comprised of a rigid or flexible material.

28. The sizer of claim 26 wherein:
the seal is integrated in the housing.

29. The sizer of claim 26 wherein:
the seal is selected from the group consisting of O-rings, printed seals, continuous cut seals, and overmolded seals.

30. The sizer of claim 26 wherein:
the seal is a conformal seal.

31. The sizer of claim 26 wherein:
the housing comprises:
(i) a groove on a surface adjacent to the core; and
(ii) a sealant injection port that is adapted to facilitate injection of a sealant material into the groove to form the seal.

32. The sizer of claim 26 wherein:
the core comprises:
(i) a groove on a surface adjacent to the housing; and
(ii) a sealant injection port that is adapted to facilitate injection of a sealant material into the groove to form the seal.

33. The sizer of claim 1 wherein:
the housing cooling channel and the core cooling channel are adapted to circulate a coolant selected from the group consisting of liquids and gases.

34. A method for creating a sizer adapted to cool an extrudate, comprising the steps of:
creating, from a metal, a core comprising an upper core portion and a lower core portion, each of the upper core portion and the lower core portion comprising:
an extrusion channel configured to accommodate the extrudate;
a core cooling channel; and
a core vacuum channel in fluid communication with the extrusion channel;
creating, from a polymer, a housing for housing the core, comprising an upper housing portion and a lower housing portion, each of the upper housing portion and the lower housing portion comprising:
a housing cooling channel; and
a housing vacuum channel; and
joining the upper housing portion to the upper core portion, the upper core portion to the lower core portion, and the lower core portion to the lower housing portion, to form:
a continuous cooling pathway for the circulation of a coolant through the sizer, comprising the housing cooling channel and the core cooling channel; and
a continuous vacuum pathway for the suction of the extrudate, comprising the housing vacuum channel and the core vacuum channel;
wherein the upper core portion and the lower core portion are separately formed; and
wherein the upper housing portion and the lower housing portion are separately formed.

35. The method of claim 34 wherein the core cooling channel is configured to closely conform to the extrusion channel along at least a portion thereof.

36. The method of claim 34 wherein:
the housing cooling channel is configured to have at least one curved segment; or
the housing vacuum channel is configured to have at least one curved segment.

37. The method of claim 34 wherein the housing further comprises:
a cooling intake in fluid communication with the housing cooling channel;
a cooling exhaust in fluid communication with the housing cooling channel; and
a vacuum intake in fluid communication with the housing vacuum channel.

38. The method of claim 34 wherein:
the core is created by subtractive manufacturing; and
the housing is created by additive manufacturing.

39. The method of claim 38 wherein:
the subtractive manufacturing comprises electrical discharge machining; and
the additive manufacturing comprises 3-D printing.

40. The method of claim 34 wherein:
the core is created by additive manufacturing; or
the housing is created by additive manufacturing.

41. The method of claim 40 wherein:
a portion of the housing is subsequently created by subtractive manufacturing after additive manufacturing.

42. The method of claim 40 wherein:
a portion of the core is subsequently created by subtractive manufacturing after additive manufacturing.

43. The method of claim 34 wherein:
the core cooling channel comprises at least one curved segment; or
the core vacuum channel comprises at least one curved segment.

44. A sizer for cooling an extrudate, comprising:
a core comprising an upper core half and a lower core half, each of the upper core half and the lower core half comprising:
an extrusion channel configured to accommodate the extrudate;
a core cooling channel having at least one curved segment; and
a core vacuum channel in fluid communication with the extrusion channel and having at least one curved segment;
wherein the core is comprised of a metal; and
a housing for housing the core, comprising an upper housing half and a lower housing half, each of the upper housing half and the lower housing half comprising:
a housing cooling channel in fluid communication with the core cooling channel and having at least one curved segment; and
a housing vacuum channel in fluid communication with the core vacuum channel and having at least one curved segment;
wherein the housing is comprised of a polymer;
wherein the housing cooling channel and the core cooling channel form a cooling pathway adapted to circulate a coolant through the sizer; and
wherein the housing vacuum channel and the core vacuum channel form a vacuum pathway adapted to transmit suction forces to the extrudate.

45. The sizer of claim 44 further comprising:
- a cooling intake in fluid communication with the housing cooling channel and adapted to receive the coolant;
- a cooling exhaust in fluid communication with the housing cooling channel and adapted to exhaust the coolant; and
- a vacuum intake in fluid communication with the housing vacuum channel and adapted to intake the suction forces.

* * * * *